United States Patent [19]

Appleberry

[11] Patent Number: 5,152,381
[45] Date of Patent: Oct. 6, 1992

[54] MULTIPLE FAIL OPERATIONAL ROTARY ACTUATOR WITH SERIES MOUNTED MOTOR STAGES

[75] Inventor: Walter T. Appleberry, Long Beach, Calif.

[73] Assignee: Rockwell International Corporation, Seal Beach, Calif.

[21] Appl. No.: 767,607

[22] Filed: Sep. 30, 1991

[51] Int. Cl.⁵ .................. F01B 21/00; B60K 41/20
[52] U.S. Cl. ...................... 192/1.37; 60/716; 74/661; 192/1.36
[58] Field of Search .......... 192/1.36, 1.37; 475/7; 60/713, 716, 719; 74/661, 665 C; 318/564

[56] References Cited

U.S. PATENT DOCUMENTS

| | | | |
|---|---|---|---|
| 3,631,944 | 1/1972 | Courtenay et al. | 192/1.36 |
| 3,986,412 | 10/1976 | Farley | 74/661 |
| 4,215,592 | 8/1980 | Calvert | 74/665 C X |
| 4,858,490 | 8/1989 | Grant | 60/716 X |

FOREIGN PATENT DOCUMENTS 1525571 9/1978 United Kingdom .............. 74/661

*Primary Examiner*—Rodney H. Bonck
*Attorney, Agent, or Firm*—Lawrence N. Ginsberg; Charles T. Silberberg

[57] ABSTRACT

A multiple fail operational rotary actuator comprising a static base, at least two serially connected rotary motor stages, a power source, and braking devices. The rotary motor stages are connected by anti-friction bearing assemblies. A first stage is connected to the static base while a final stage is connected to an output shaft of the rotary actuator. The power source provides power for the rotary motor stages. The braking devices are connected to the rotary motor stages for preventing relative motion between any failed motor stage and the adjacent motor stage ahead of that failed stage.

13 Claims, 3 Drawing Sheets

MULTIPLE FAIL OPERATIONAL ROTARY ACTUATOR WITH SERIES MOUNTED MOTOR STAGES

BACKGROUND OF THE INVENTION

1. Field of the Invention

The present invention relates generally to redundant fail safe actuators and more particularly to dual or multiple failure operational actuators.

2. Description of the Related Art

Actuators often require redundancy to guarantee reliability even if a failure in the actuator has occurred. For aerospace applications, redundancy in actuators is of prime importance. Actuators presently in use include two motors and a common differential gear box. The gear box represents a single point failure. Failure of the gear box renders the actuator inoperable. There is a need for more reliable actuators that do not contain such single point failures. As will be disclosed below, the present invention provides such redundancy. Although developed for use with the Space Shuttle, the actuator of the present invention has broad based applications.

U.S. Pat. No. 4,215,592, issued to J. A. Calvert, entitled "Redundant Motor Drive System", discloses two motors operating on a common output shaft. It is limited to less than a half revolution and is also limited to two stages. The actuator contains six ball bearings. The failure of any one of these bearings would result in actuator failure. Such a bearing seizure is a major cause of actuator failure. The Calvert system is redundant only with respect to the motors and gear trains, but not with respect to the bearings.

SUMMARY OF THE INVENTION

The present invention is a multiple fail operational rotary actuator. In its broadest aspects, the rotary actuator comprises a static base, at least two serially connected rotary motor stages, power source means, and braking means. The rotary motor stages are connected by anti-friction bearing assemblies. A first stage is connected to the static base while a final stage is connected to an output shaft of the rotary actuator. The power source provides power for the rotary motor stages. The braking means are connected to the rotary motor stages for preventing relative motion between any failed motor stage and the adjacent motor stage ahead of that failed stage.

BRIEF DESCRIPTION OF THE DRAWINGS

The same elements or parts throughout the figures are designated by the same reference characters.

DETAILED DESCRIPTION OF THE PREFERRED EMBODIMENTS

Figure 1:
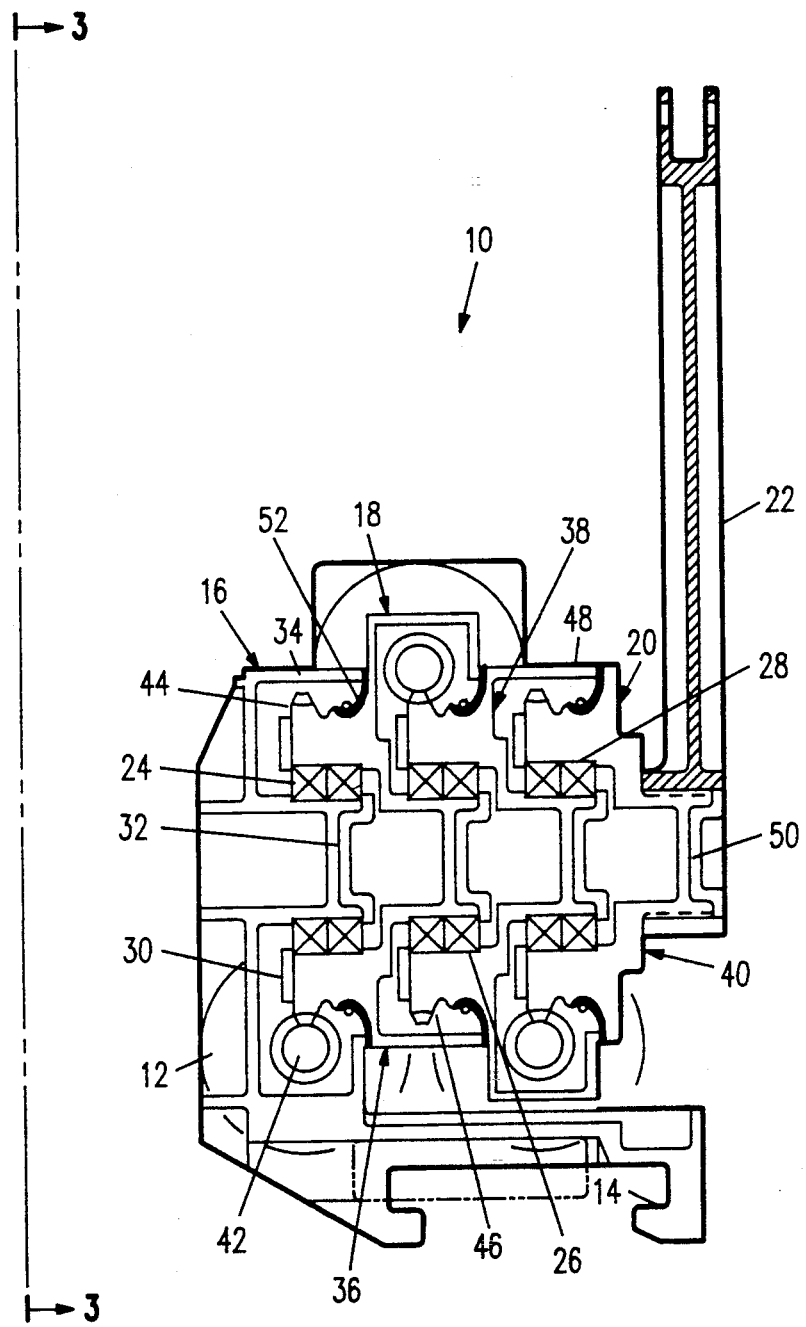
FIG. 1 is a cross sectional side view of a preferred embodiment of the rotary actuator of the present invention.

Referring to the drawings and characters of reference marked thereon, FIG. 1 illustrates a side view of a preferred embodiment of the present invention, designated generally as 10. A base 12 of the actuator 10 is normally connected to a part of a structure which does not move with respect to the output of the actuator 10. The base 12 in FIG. 1 has a T-slot 14 which mates with a standard bridge fitting for the Shuttle Orbiter. As noted above, it is for use with the Orbiter that the invention was specifically designed. Although particularly adaptable for use with the Orbiter which requires utmost reliability, it is understood that this application is by way of illustration and not limitation. The invention may be used for many applications requiring utmost reliability including medical equipment, emergency or rescue equipment, nuclear mechanisms and machinery involving possible risk to life.

Three serially connected rotary motor stages, designated generally as 16, 18 and 20 are positioned between the base 12 and an output crank 22. Three duplex anti-friction bearing assemblies 24, 26, and 28 are each connected between adjacent motor stages. Each anti-friction bearing assembly is retained on one end by a retaining ring 30 and on the other end by a bearing retainer 32.

Each motor stage includes a housing 34. Each bearing retainer 32 is connected to a respective housing 34 by conventional fastening means such as a nut and bolt (not shown). Braking means are connected to the rotary motor stages 16, 18, 20 for preventing relative motion between a failed motor stage and the adjacent motor stage ahead of that failed stage. In the preferred embodiment, these braking means include serially connected worm assemblies, designated generally 36, 38 and 40.

The first worm assembly 36 has a first end rotatably mounted to the static base 12. A second end of the first worm assembly 36 extends into the second rotary stage 18. The worm assembly 36 includes a worm gear 42 rotatably engaged with an associated worm wheel 44.

Similarly, the second worm assembly has a worm wheel 46 with a first end being rotatably mounted to the second end of the first worm wheel 44. The second end extends into the third rotary motor stage 20 and forms a housing 48 thereof.

The third worm assembly 40 is constructed and disposed in a similar manner. However, its second end comprises an output shaft which is securely attached to the output crank 22.

The embodiment illustrated includes three serially connected rotary motor stages. As can be seen by reference to FIG. 1, and as described above, these stages are connected front end to back end. This arrangement allows for two failures. However, if the design requirement is to tolerate one failure, then only two rotary motor stages would be required. Similarly, if three failures are used to be tolerated then four rotary motor stages would be required, and so forth. Dust seals 52 are located between adjacent motor stages to prevent the entry of dust and other contaminants therein.

Figure 2:
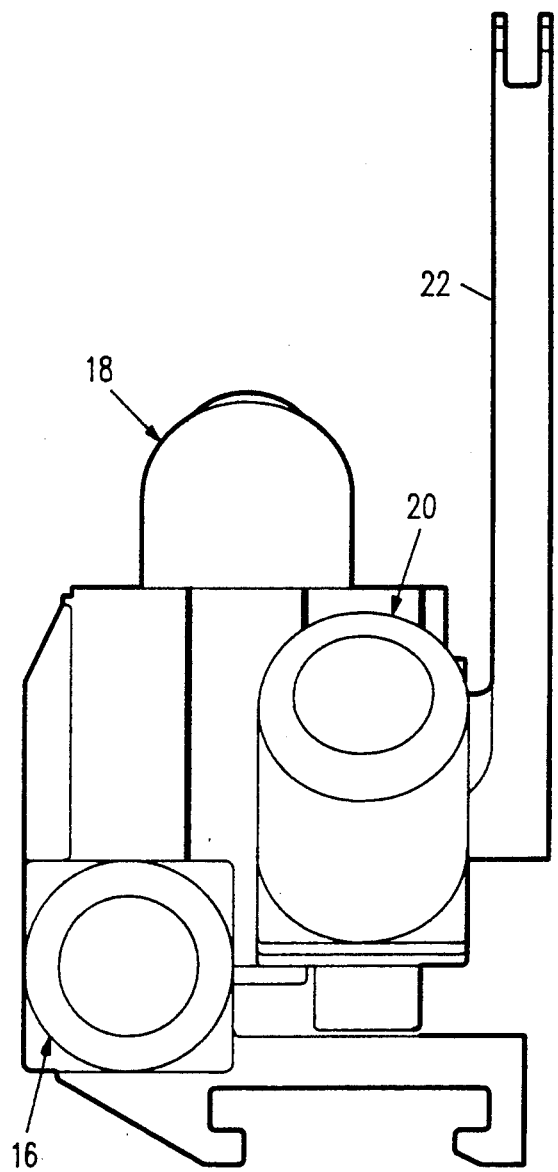
FIG. 2 is an unsectioned side view of the rotary actuator of the present invention.

As best seen with reference to FIG. 2, if continuous rotation is required, the actuator 10 must be lengthened to increase the distance between the first stage 16 and the third stage 20. This provides passage of the second stage 18 motor between the first stage 16 and third stage 20.

Figure 3:
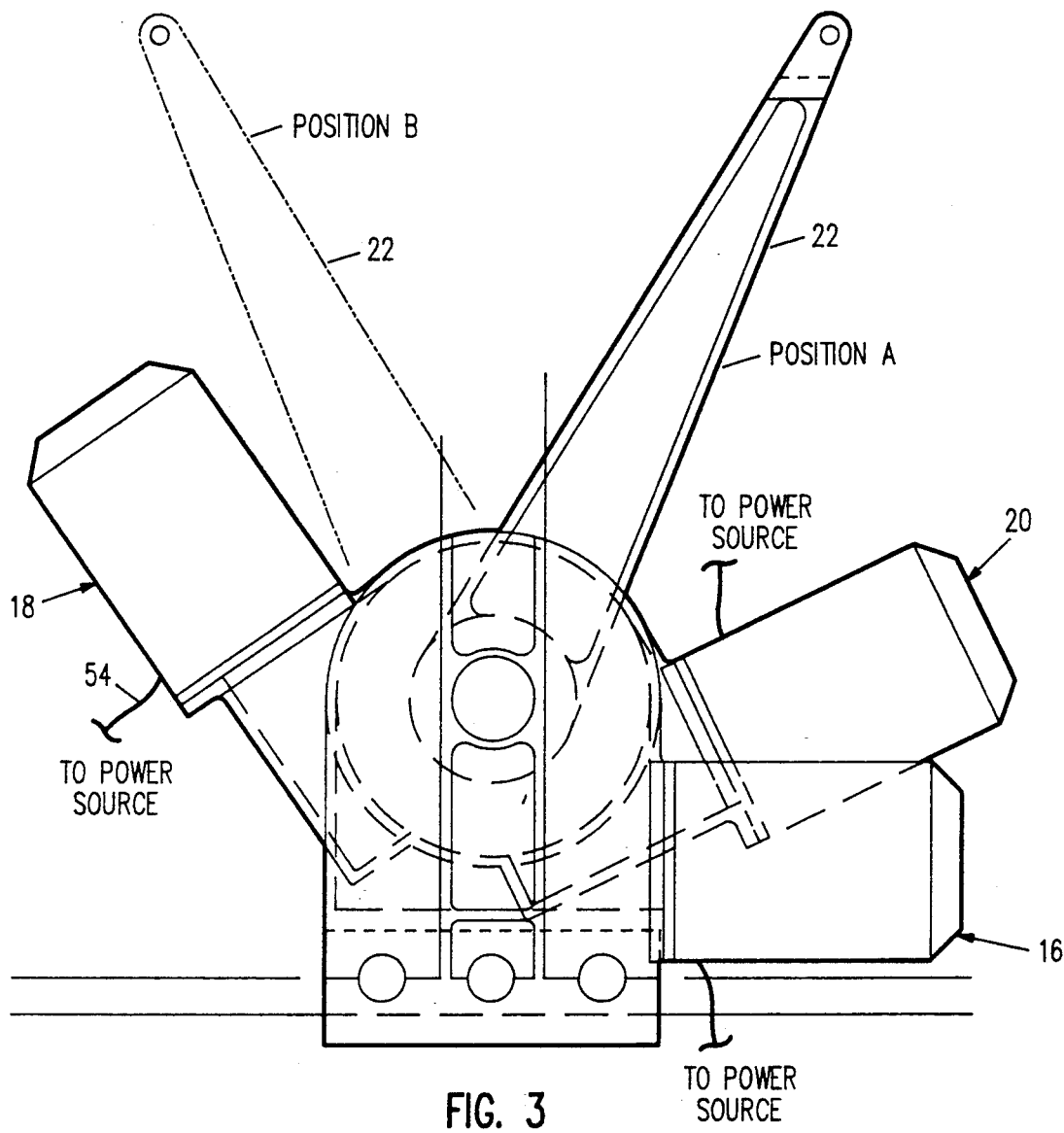
FIG. 3 is an end view of the present invention, shown along lines 3—3 of FIG. 1.

Referring now to FIG. 3, the motors are inclined such that the failure of any one of the three stages 16, 18, 20 still enables them to rotate without interference through the full stroke. This allows the output crank 22 to move between positions A and B.

Suitable electrical connection means 54, such as slack wires, are connected to a power source for providing power to the rotary motor stages. Other forms of electrical connection means 54 may provide continuous, reversible rotation between the adjacent rotary motor stages. Such electrical connection means may include slip rings or rol rings. Another approach that allows limited rotation but of several revolutions is a helical annular ribbon. If the motor stages are run by hydraulic or pneumatic means, the connectors 54 would comprise flexible hoses.

The FIG. 1-3 embodiment illustrates the use of a cantilevered output shaft 50. The cantilever consists of the three rotary motor stages. The end of the cantilever comprises the output shaft 50. It is understood that this cantilever can be supported at the output shaft 50, thus stiffening the actuator 10, if desired.

During operation, the second and third motor stages 18, 20, orbit about the actuator's principal axis with the first motor stage 16 stationary and mounted on the base 12. Normal orbits are ⅓ of crank travel for the second stage 18 and ⅔ for the third stage 20. As can be seen in FIG. 2, the clock angles of the second and third stages are determined by the required crank travel and by worst case failure modes, a few of which are listed below. A bearing failure has the same effect on output motion as a motor failure:

a) If first and second stage motors fail, no orbiting occurs, and the third stage motor drives the output crank.

b) If the second and third stage motors fail, the first stage motor drives them, and the crank, through the full crank travel. Thus, the clock angle of the second motor (measured from the horizontal) is equal to the full crank travel.

c) If first and third stage motors fail, the second is stationary and drives the third stage and crank through the full crank travel.

d) The clock angle of the third motor is the result of consecutive failures, in which the first or second motor fails during counterclockwise output and remains failed when the actuator output is reversed, at which time the third motor also fails. Thus, the third motor orbits up by ½ the crank travel (the minimum for any failure mode) and, upon actuator reversal, orbits down through the full crank travel angle (the maximum for any failure mode). Therefore, the maximum net clockwise motion, from the initial position shown, would bring the third motor down to the horizontal.

Variations on the gear interface illustrated in the figures are possible. The worm gear set may be replaced by the more efficient hypoid gear set as used in automotive rear axles (standard motor brakes must be added). Or, the motors could be end-to-end, replacing the worm gears with direct stage to stage in-line drive (also with motor brakes).

Figure 4:
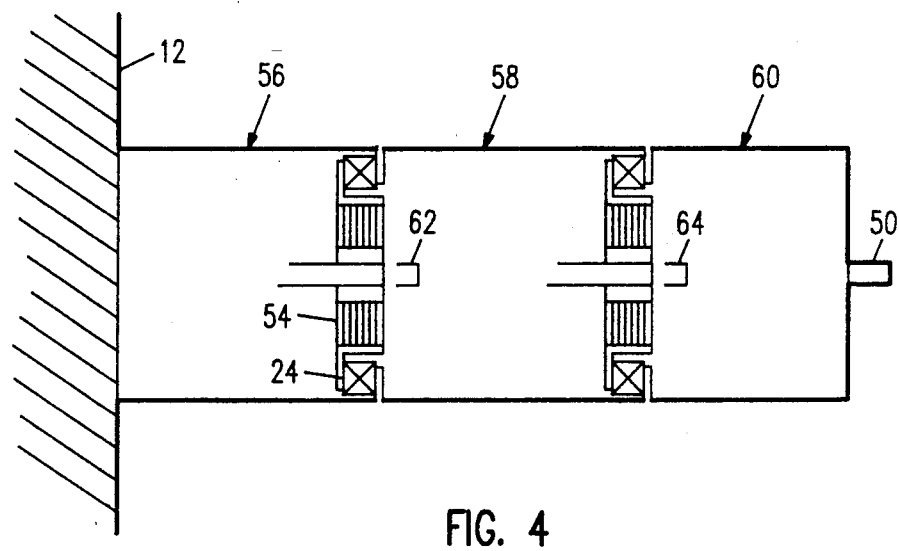
FIG. 4 is another preferred embodiment of the present invention illustrating the use of three coaxial motor stages in series.

Referring now to FIG. 4, the use of three co-axial cylindrical motor stages 56, 58 and 60 are illustrated. Although the overall length of the actuator would increase with the embodiment shown in FIG. 4, the diameters of the motor stages would decrease substantially. The output shaft 62 of the first motor stage 56 plugs into the base of the second motor stage 58, and the output shaft 64 of the second motor stage 58 plugs into the base of the third motor stage 60. The electrical connector 54 illustrated in this figure is represented by annular ribbon hardware.

The present invention has some of the following principal advantages. Any combination of dual failures (two motors, two duplex bearing sets, both axle bearings, two locked worm gear sets; or, any two failures of any of these items in any combination, such as one motor and one bearing, or a motor and gear set, or gear set and bearing, in any two stages, adjacent or not, etc.) may be tolerated without any emergency or any kind of procedures, required. Output continues at a reduced speed, but does, in fact, always continue. Use of a dual failure operational actuator meets NASA requirements without extra vehicular activity (EVA) backup. This reduces a major expense associated with EVA. There are no single point failure modes (no single or dual failures can stop the actuator), such as with a common gear differential or non-redundant bearings.

Obviously, many modifications and variations of the present invention are possible in light of the above teachings. It is therefore to be understood that, within the scope of the appended claims, the invention may be practiced otherwise than as specifically described.

I claim:

1. A multiple fail operational rotary actuator, comprising:
    a) a static base;
    b) at least two serially connected rotary motor stages connected by anti-friction bearing assemblies, each motor stage having a front end and a back end, said motor stages being connected front end to back end, the back end of a first stage being connected to said static base, the front end of said first stage being an output shaft, said output shaft being rotatable with respect to its back end, the front end of a final stage being an output shaft of said rotary actuator;
    c) power source means for providing power to said rotary motor stages; and
    d) braking means connected to said rotary motor stages for preventing relative motion between any failed motor stage and the adjacent motor stage ahead of said failed stage.

2. The rotary actuator of claim 1 wherein said braking means comprises:
    a) a first worm assembly having a first worm wheel with a first end being rotatably mounted to said static base and a second end extending into a second motor stage and forming a housing thereof;
    b) a second worm assembly having a second worm wheel with a first end being rotatably mounted to said second end of said first worm wheel and a second end extending into a third motor stage and forming a housing thereof; and
    c) successive worm assemblies being positioned first end to second end in the same manner as element (b), above, a second end of a final worm wheel of said successive worm assemblies being said output shaft of said rotary actuator.

3. The rotary actuator of claim 2 wherein each of said worm assemblies comprises a worm gear rotatably engaged with an associated worm wheel.

4. The rotary actuator of claim 1 wherein said serially connected rotary motor stages comprise;
    at least two rotary motors connected end to end, said motors including said braking means, said braking means engaging when power to said motors is terminated.

5. The rotary actuator of claim 1 wherein said power source means comprises slack wires, for providing electrical connection between adjacent rotary motor stages.

6. The rotary actuator of claim 1 wherein said power source means comprises at least one electrical power source.

7. The rotary actuator of claim 1 wherein said power source means comprises at least one pneumatic power source.

8. The rotary actuator of claim 1 wherein said power source means comprises at least one hydraulic power source.

9. A multiple fail operational rotary actuator, comprising:
   a) a static base;
   b) at least two serially connected rotary motor stages connected by anti-friction bearing assemblies, each motor stage having a front end and a back end, said motor stages being connected front end to back end, the back end of a first stage being connected to said static base, the front end of said first stage being an output shaft, said output shaft being rotatable with respect to its back end, the front end of a final stage being an output shaft of said rotary actuator;
   c) electrical connection means being located at the interface between two adjacent rotary motors for continuous, reversible rotation therebetween; and
   d) braking means connected to said rotary motor stages for preventing relative motion between any failed motor stage and the adjacent motor stage ahead of said failed stage.

10. The rotary actuator of claim 9 wherein said braking means comprises:
    a) a first worm assembly having a first worm wheel with a first end being rotatably mounted to said static base and a second end extending into a second motor stage and forming a housing thereof;
    b) a second worm assembly having a second worm wheel with a first end being rotatably mounted to said second end of said first worm wheel and a second end extending into a third motor stage and forming a housing thereof; and
    c) successive worm assemblies being positioned first end to second end in the same manner as element (b), above, a second end of a final worm wheel of said successive worm assemblies being said output shaft of said rotary actuator.

11. The rotary actuator of claim 10 wherein each of said worm assemblies comprises a worm gear rotatably engaged with an associated worm wheel.

12. The rotary actuator of claim 9 wherein said serially connected rotary motor stages comprise;
    at least two rotary motors connected end to end, said motors including said braking means, said braking means engaging when power to said motors is terminated.

13. The rotary actuator of claim 9 wherein said electrical connection means comprises slack wires, for providing electrical connection between adjacent rotor motor stages.

* * * * *